Patented July 10, 1934

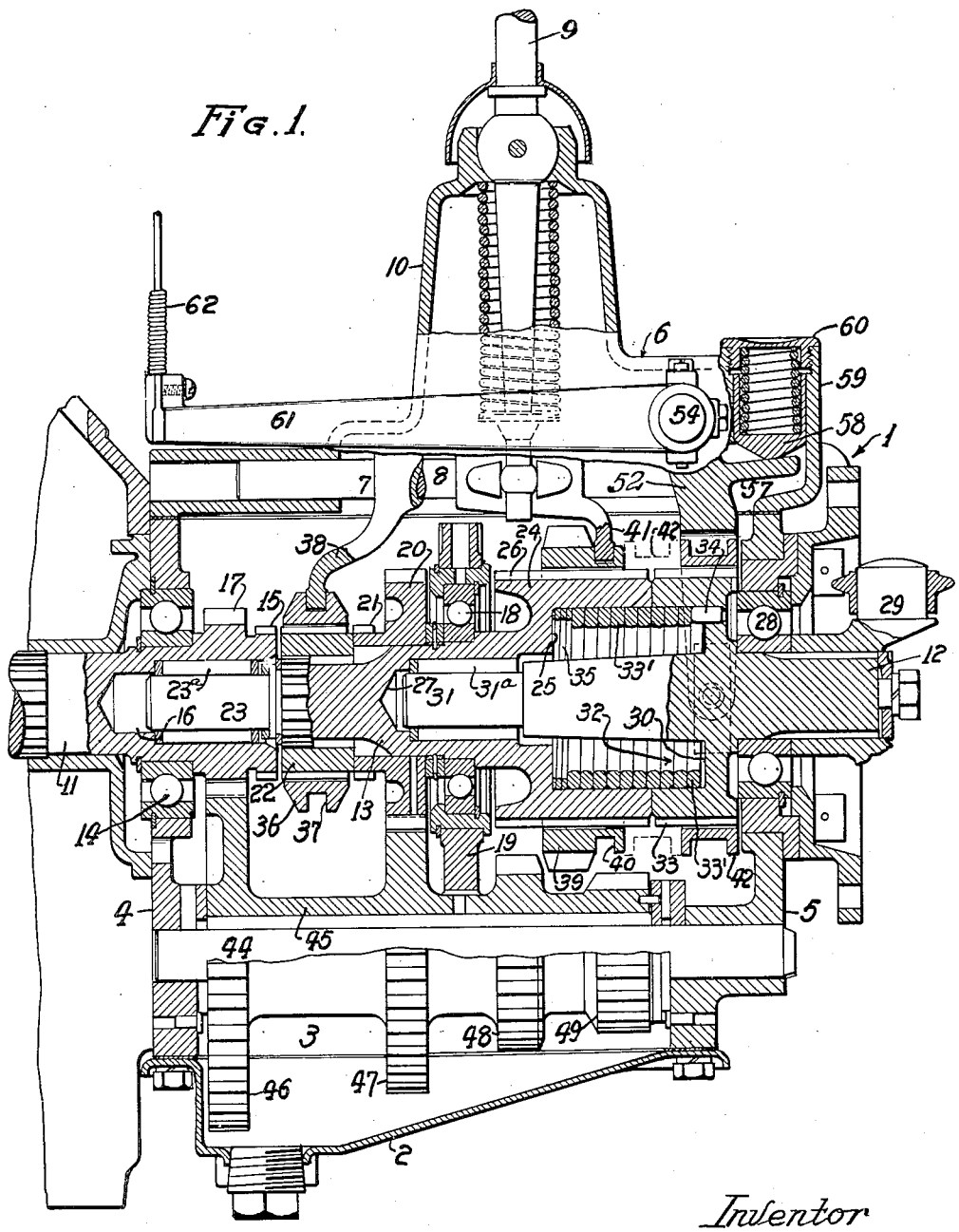

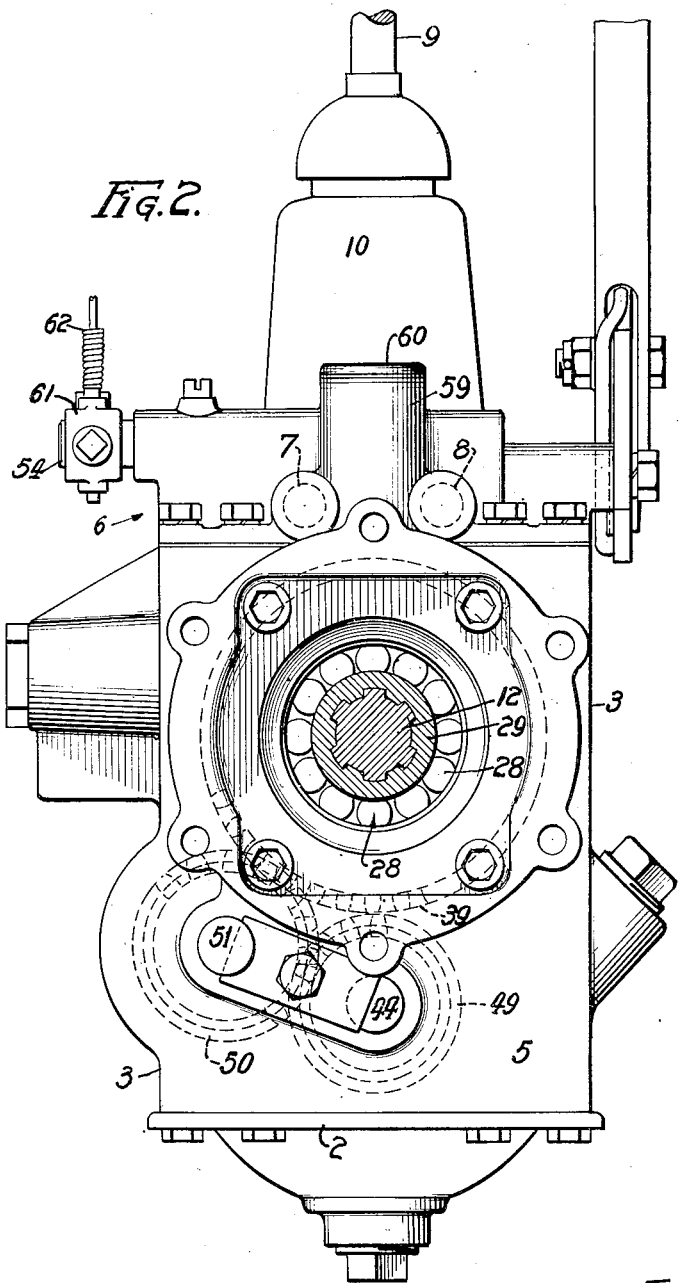

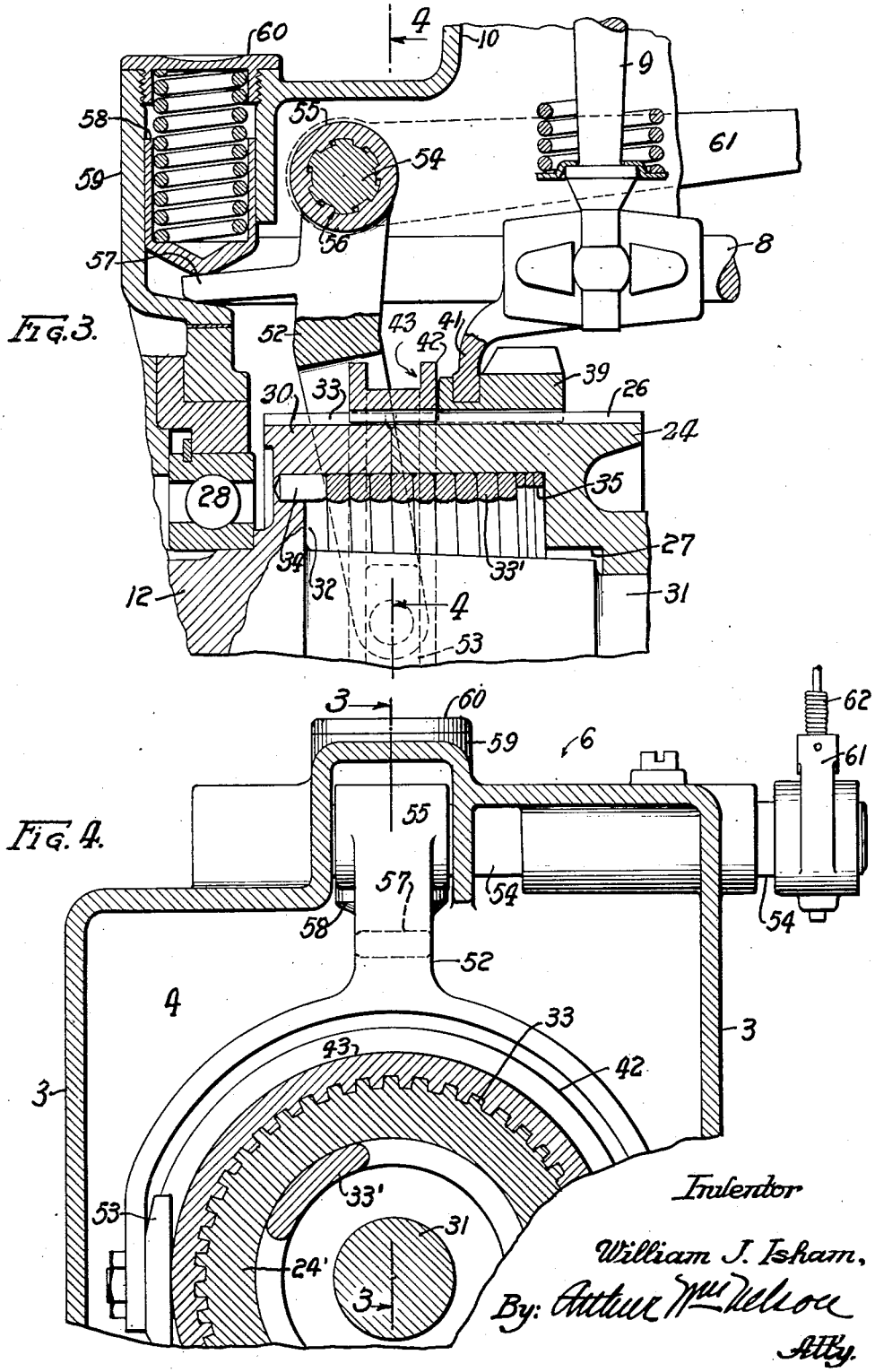

1,966,296

UNITED STATES PATENT OFFICE 1,966,296

AUTOMOTIVE TRANSMISSION

William J. Isham, Indianapolis, Ind., assignor to L. G. S. Devices Corporation, Indianapolis, Ind., a corporation of Indiana Application August 10, 1931, Serial No. 556,185

23 Claims. (Cl. 74—333)

This invention relates to improvements in automotive transmissions and it consists of the matters hereinafter described and more particularly pointed out in the appended claims.

The invention is more particularly concerned with change speed transmissions for automobiles providing a plurality of forward speeds and a reverse speed with free wheeling in some of said speeds.

In certain transmissions of this kind, free wheeling is provided in second and third speeds forward only and the unit providing such free wheeling is usually incorporated in the transmission and has no function in first speed forward and reverse.

In certain other transmissions, free wheeling is provided by a unit separate from the transmission but so correlated with respect thereto as to provide free wheeling in all speeds forward. However, when such a transmission is manipulated to provide reverse speed, it is necessary first to throw out or render ineffective the free wheeling mechanism by the manipulation of means provided therefor and which means must again be manipulated to provide free wheeling when shifting from reverse back into first speed forward.

The primary object of the invention is to provide an automotive transmission providing the usual forward speeds and reverse and which includes means incorporated in the transmission itself to automatically lock-out free wheeling when going into reverse and to automatically re-establish the free wheeling action when going out of reverse, said means being so constructed as to be operable to lock-out the free wheeling action in any of the forward speeds desired.

Another object of the invention is to provide a transmission of the kind which is simple in construction; is positive in operation; has the parts thereof so correlated as to be compact yet easy for inspection; and at the same time so disposed as to keep well within the limited space available in the transmission of the modern automobile.

The above mentioned objects of the invention as well as others, together with the many advantages thereof, will more fully appear as I proceed with my specification.

In the drawings:—

Fig. 1 is a longitudinal vertical sectional view through an automotive change speed transmission embodying my invention.

Fig. 2 is a view in rear end elevation thereof.

Fig. 3 is a detail longitudinal vertical sectional view through a portion of the transmission on an enlarged scale as taken on the line 3—3 of Fig. 4.

Fig. 4 is a detail transverse vertical sectional view through a part of the transmission as taken on the line 4—4 of Fig. 3.

Referring now in detail to that embodiment of the invention, illustrated in the accompanying drawings:—1 indicates the open top casing of the transmission which includes a bottom wall 2, side walls 3, and front and rear end walls 4 and 5 respectively. Associated with said casing and closing the open top thereof is a cover 6 secured to the casing in any suitable manner. In said cover are the shift rods or rails 7 and 8 respectively both formed to be operatively engaged by the bottom end of a shift lever 9 having a ball and socket engagement in a hollow cone like housing 10 rising from the cover about midway between its ends.

The shift rod 7 is for the second and high gear or speed of the transmission while the shift rod 8 is for the low and reverse gear or speed of the transmission.

11 indicates the drive shaft of the transmission adapted for connection with an engine (not shown) in any suitable manner, 12 indicates the coaxially disposed driven shaft of the transmission adapted for connection with the propeller shaft of the automobile in any suitable manner and 13 indicates a third shaft intermediate and coaxially with the drive and driven shafts just mentioned.

The shaft 11 is journalled in antifriction bearings 14 disposed in the front wall 4 of the transmission and on the rear end of said shaft are spline teeth 15. In the rear end of this shaft is provided an axial recess 16 and between the bearing 14 and spline teeth 15 is an integral gear 17.

The intermediate shaft 13 is journalled at a point midway between its ends in an antifriction bearing 18 supported in a transverse web 19 extending between the side walls 3 of the casing. Rotatively mounted upon a part of this shaft just in advance of the bearing 18 is a gear 20 having spline teeth 21 on its forward end of the same size and number as the spline teeth 15 before mentioned. A member 22 is splined to said shaft between the teeth 15 and 21 and has spline teeth matching said teeth 15 and 21. The front end 23, of said shaft is reduced in diameter and is journalled in antifriction bearings 23a in the recess 16 of the drive shaft 11.

The rear end of the shaft 13 is radially enlarged to provide a cup like clutch member 24 having a rearwardly facing recess 25 therein and said member has external clutch teeth 26 extending the full length thereof. In that portion of the shaft 13 forwardly of the member 24 is a rearwardly facing recess 27 of a diameter considerably less than that of the recess 25.

The driven shaft 12 is journalled at a point near its rear end in an antifriction bearing 28 carried by the rear end wall 5 of the transmission casing. That portion of said shaft to the rear of this bearing has splined thereto a portion 29 of a universal or like joint whereby the shaft 12 is connected to the associated propeller shaft (not shown). Just forward of the bearing 28, said shaft is formed to provide a cup like clutch member 30 and the front end 31 of said shaft is reduced in diameter to be journalled in an antifriction bearing 31a disposed in the recess 27 of the shaft 13. The member 30 of the shaft 12 matches the member 24 of the shaft 13 and has a forwardly facing recess 32 and external spline teeth 33 extending the full length thereof. The recesses 25 and 32 of the clutch members 24 and 30 coact to provide a closed pocket in which is located a clutch spring 33'. The rear of this spring has an axial toe 34 anchored in the clutch member 30 while the turns of the front end of this spring are made of stock of reduced diameter to provide the energizing end 35 of this spring.

When the clutch member 24 is being driven in one direction, it acts through the energizing end 35 of said spring to unwind the spring 33'. This radially enlarges or expands the spring so that it grips the annular wall of the pocket in said clutch members 24 and 30 and clutches the same together. Should the clutch member 30 tend to rotate faster than the clutch member 24 as when the engine is decelerated wherein it is being wheel driven under momentum, then said member tends to wind up and radially contract said spring so that the member 30 overruns the member 24.

Splined on the member 22 fixed to the shaft 13, is a collar 36 having an external annular groove 37 in its periphery in which is engaged one end of a shifter yoke 38, the other end of which is fixed to the shift rod 7. Upon movement of the shift rod 7 in the proper direction, it is apparent that the collar 36 may be shifted from a neutral position as shown in Fig. 1 into one position wherein the shaft 11 is connected to the shaft 13 or into another position wherein the gear 20 is connected to said shaft 13.

Associated with and splined upon the clutch member 24 is a gear collar 39 formed at its rear end with an external annular groove 40 in which is operatively engaged, one end of a shifter fork 41, the other end of which is fixed to the shift rod 8. When the gear collar 39 is shifted rearwardly, it is apparent that it will bridge the abutting ends of the clutch members 24 and 30 and will positively connect them together independent of the action of the clutch spring. Ordinarily when the associated shift rod 8 is "neutral" then said gear collar stands about midway between the ends of said clutch member 24 as best shown in Fig. 1.

42 indicates a collar internally splined to match the teeth 33 and 26 of the clutch members 30 and 24 respectively and in said collar is an annular groove 43 to receive a shifter yoke in a manner and for a purpose later to appear. This collar normally stands in a position bridging the abutting ends of the clutch members 24 and 30 as shown in full lines in Fig. 3 and as shown in dotted lines in Fig. 1. When in this position, said clutch members are again positively connected, independent of the clutch spring and when said collar is shifted rearwardly as will later appear, into the full line position shown in Fig. 1, it is apparent that it is ineffective in positively connecting said clutch members together.

The countershaft of the transmission is indicated at 44. This shaft is disposed in a plane vertically below the shafts 11, 12 and 13 and is fixed at its ends in any suitable manner in the end walls 4 and 5 of the transmission casing. Suitably journalled on this shaft by means of suitable anti-friction bearing means, is a sleeve 45 having stepped down, longitudinally spaced gears 46, 47, 48 and 49 respectively, decreasing in diameter in the order named. The gears 46 and 47 are in constant mesh with the gear teeth 17 on the drive shaft 11 and the gear 20 respectively. The gear 48 is the first speed forward gear while the gear 49 is the reverse gear of the transmission and is indicated in dotted lines in Fig. 2. As before mentioned, the gear collar 39 is shiftable upon the clutch member 24 and when shifted forwardly, engages the gear 48 and when shifted rearwardly engages the idler gear 50 to provide reverse.

The collar 42 is actuatable under certain conditions by a yoke 52 having arms that straddle the same and carry pads 53 at their ends engaged in the groove 43 of said collar. This yoke is so mounted on a transverse rock shaft 54 journalled in the side walls of the casing cover 6 as to have a limited swinging movement in one direction but not in the other direction so that when said shaft is rocked in the proper direction, the yoke swings therewith. In this respect, it is pointed out that the yoke includes a sleeve 55 enclosing that part of said shaft within the cover and that said shaft part and sleeve are splined as at 56 with the splined grooves of the sleeve of a greater arcuate length than that of the spline ribs on the shaft. Thus the yoke is capable of a limited lost motion with respect to the shaft in one direction.

Means is provided which normally act to swing the yoke in a clockwise direction toward and into a position wherein the collar 42 is bridging the abutting ends of the clutch members 24 and 30. Such a means includes a rearwardly extending lip 57 on the yoke near said sleeve 55 and associated therewith is a spring pressed plunger 58 disposed in an upright tubular boss 59 at the rear end of the cover. A cap 60 closes the top end of said boss. One end of the shaft 54 (preferably the left hand end) has a horizontally disposed, forwardly extending lever 61 secured thereto and which lever may be actuated from a point convenient for the operator by means of a Bowden wire and tube 62 attached to the front end of said lever.

When the transmission is in neutral, the gear collar 39 is disposed midway of the ends of the clutch member 24 and in a plane midway between the gears 48 and 49 of the countershaft and out of engagement with the idler gear 50 on the shaft 51. Assume that the lever 61 has been swung upwardly to that limit permitted by its actuating member through the Bowden wire and tube 62. Under such conditions, the yoke 52 will be swung forwardly by the spring pressed plunger 58 and this will cause a forward movement of the shift collar 42 so that it stands in a position bridging the abutting ends of the clutch members 24 and 30. This movement of the collar, to this position, is permitted by means of the lost motion provided in the splined connection between the shaft 54 and the sleeve 55 of the yoke 52.

As to the position of the parts providing second and high speed gear forward, when the transmission is in neutral, the collar 36 is engaged solely upon the spline member 22 and out of engagement with the spline teeth 15 and 21 of the shaft 11 and gear 20 respectively.

When the shaft 11 is being driven, it is apparent that the gears on the countershaft 44 as well as the idler gear 50 and gear 20 are being constantly driven. To provide first speed forward the lever 9 is manipulated to selectively engage the shift rod 8 and as this rod is moved forward, the gear 39 is caused to engage the gear 48 on the countershaft. The cup like clutch member 24 then becomes driven and this without free wheeling action.

Under certain conditions free wheeling might be desired in first speed forward and to provide the same, the lever 61 may be actuated to rock the shaft 54 in the proper direction and so soon as the lost motion between said shaft and the yoke sleeve 53 is taken up, the yoke swings counterclockwise and moves the collar 42 rearwardly against the action of the spring pressed plunger 58. This removes the positive connection between the clutch members 24 and 30 and when the member 24 is being driven, it acts to unwind and radially expand the spring 33' to clutch said two members together so that the drive is through the gripping action of said spring. Should the shaft 12 tend to rotate faster than the clutch member 24, this will act to wind up and radially contract said spring to permit an overrunning of the clutch member 30 with respect to the clutch member 24.

In going into second speed forward, the lever 9 is manipulated to return the gear 39 to neutral and then the shift rod 7 is operatively engaged and shifted rearwardly and this shifts the collar 36 rearwardly so as to engage the spline teeth 21 of the gear 20. This connects the gear 20 positively to the shaft 13 carrying the clutch member 24. The drive is then from the shaft 11 through the gears 17, 46, 47, gear 20, collar 36 to the member 22 splined to the shaft 13.

In going into high or third speed forward, the rod 7 is shifted forwardly to engage the collar 36 with the spline teeth 15 of the shaft 11, and then the drive is through the teeth 15 collar 36 to the member 22 splined on the shaft 13 so that the shafts 11 and 13 are positively connected together and rotate together.

With the collar 42 held in the position shown in full lines in Fig. 1, it is apparent that free wheeling is available in both the second and third speeds forward as just previously mentioned.

Should it be desired while in either second or third speed forward to lock-out the free wheeling action, it is only necessary to release the lever 61 through its Bowden wire and tube 62, when the spring pressed plunger 58 will act on the lip 57 to depress the same and swing the yoke forward. This will carry the collar 42 forwardly into a position bridging the abutting ends of the clutch members to positively connect them together independent of the action of the clutch spring 33'. The free wheeling lock-out position of this collar is best shown in Fig. 3.

Now assume that it is desired to go into reverse. In the manipulation of the shift lever 9, of course, the shift rod 7 is returned to neutral and the shift rod 8 is then picked up or operatively engaged and is shifted rearwardly.

In this movement of the gear collar 39, it will engage the collar 42 and will push it rearwardly so that it moves out of engagement with the clutch member 24. During the rearward movement of the collar 42, the spring of the plunger 58 is compressed and the lost motion between the splined connection of the shaft 54 and yoke sleeve 55 is taken up and the gear collar 39 then bridges and connects the abutting ends of the clutch members 24 and 30 together and at the same time moves into engagement with the idler gear 50. The drive then is from the shaft 11 to the gear 17 and through the gear 46, sleeve 45, gears 49 and 50 to the gear collar 39, to the clutch members 24 and 30 to the shaft 12. The shaft 12, of course, will be driven in a direction opposite that of the shaft 11.

It is apparent that from the above, the free wheeling action is automatically lock-out when going into reverse. In transmissions providing free wheeling in all speeds forward as heretofore made, it was necessary to manipulate some device or lever to lock-out free wheeling when returning into first speed forward. With my improved construction when returning from reverse to first speed forward, it is only necessary to make the conventional shift of the lever 9 to shift the gear collar 39 forward out of engagement with both clutch member 24 and 30 and out of engagement with the idler gear 50 and into engagement with the gear 48 on the countershaft.

In this movement of the gear collar 39, it of course, moves away from the collar 42 when the spring pressed plunger 58 will act through the yoke 52 to shift said collar 42 into a position again connecting the two clutch members together.

While in describing the invention, I have referred in detail to the form, arrangement and construction of the various parts thereof, the same is to be considered merely as illustrative only so that I do not wish to be limited thereto except as may be specifically set forth in the appended claims.

I claim as my invention:—

1. In an automotive transmission, a drive shaft and a driven shaft, free wheeling means associated with said shafts, means operative to produce a driving of the driven shaft in reverse from the drive shaft and means operative in going into and out of reverse for the driven shaft for automatically locking-out said free wheeling means.

2. In an automotive transmission, a drive shaft and a driven shaft, free wheeling means associated with said shafts, means operative to produce a driving of the driven shaft in reverse from the drive shaft, means normally locking-out said free wheeling means, means operative in going into reverse for rendering said locking-out means inoperative and at the same time provide a second locking-out means for said free wheeling means, said last mentioned means operating in going out of reverse to permit said first mentioned locking out means to automatically return to lock-out position.

3. In an automotive transmission, a drive shaft and a driven shaft, free wheeling means associated with said shafts, means operative to produce a driving of the driven shaft in reverse from the drive shaft, a device normally locking-out said free wheeling means and a member operative in going into reverse for displacing said device to render the same inoperative and at the same time provide a second lock-out for said free wheeling means, said device operating when said member is moved out of reverse providing position to again lock-out said free wheeling means.

4. In an automotive transmission, a drive shaft and a driven shaft, free wheeling means associated with said shafts, means operative to produce a driving of the driven shaft in reverse from the drive shaft, a device normally locking-out said free wheeling means, spring means operating on said device to hold it in lock-out position, a member operative in going into reverse for displacing said device to move it out of lock-out position and at the same time provide a second lock-out for said free wheeling means and means operable to positively hold said device out of lock-out position against the action of said spring means.

5. In an automotive transmission, a drive shaft and a driven shaft, free wheeling means associated with said shafts, means operative to produce a driving of the driven shaft in reverse from the drive shaft, a spring pressed device normally locking-out said free wheeling means and a member operative in going into reverse for displacing said device out of lock-out position and which device returns to lock-out position when said member is removed from its lock-out position in going out of reverse.

6. In an automotive transmission, a driven shaft, a second shaft rotatable in either direction, means providing a free wheeling connection between said shafts, a device for locking-out said connection when the second shaft is rotating in one direction, and a member movable to drive said second shaft in the other direction from the driven shaft, said member when so moved being operative to displace said device from lock-out position and to again lock-out said free wheeling connection.

7. In an automotive transmission, a driving shaft, a driven shaft and an intermediate shaft, means for driving the intermediate shaft from the driving shaft in either direction, a free wheeling connection between said driven and intermediate shafts, and means including two independently shiftable lock-out collars operable to lock-out said free wheeling connection, regardless of the direction in which said intermediate shaft is being driven.

8. In an automotive transmission, a driving shaft, a driven shaft and an intermediate shaft, means for driving the intermediate shaft from the driving shaft in either direction, a free wheeling connection between said driven and intermediate shafts, a device normally locking-out the free wheeling connection when said intermediate shaft is driven in one direction and means operative when said intermediate shaft is driven in the other direction for displacing said device from lock-out position and to again lock-out said free wheeling connection.

9. In an automotive transmission, a driving shaft, a driven shaft and an intermediate shaft, means for driving the intermediate shaft from the driving shaft in either direction, a free wheeling connection between said driven and intermediate shafts, a device normally locking-out the free wheeling connection when said intermediate shaft is driven in one direction, means operative when said intermediate shaft is driven in the other direction for displacing said device from lock-out position and to again lock-out said free wheeling connection and means operable to hold said device out of lock-out position after said member has been moved out of lock-out position.

10. In an automotive transmission, a driven shaft, a second shaft rotative in either direction, coacting clutch members on said shafts and enclosing an element operable to clutch said shafts together when the second shaft is being rotated in one direction, a device associated with and normally acting to connect said clutch members together independent of said clutch element, a power transmitting member associated with one of said clutch members for driving it in either direction and means for shifting said member along its associated clutch member to displace said device from lock-out position and to again connect said clutch members together independent of said clutch element.

11. In an automotive transmission, a drive shaft, a driven shaft and a gearing operative to provide a plurality of forward speeds and reverse for the driven shaft, free wheeling means associated with the driven shaft and operable to permit an overrunning of the driven shaft in all of said forward speeds, and means operating in shifting into and out of reverse for automatically locking-out said free wheeling means.

12. In an automotive transmission, a drive shaft, a driven shaft and gearing operative to provide a plurality of forward speeds and reverse for the driven shaft, free wheeling means associated with the driven shaft and operable to permit an overrunning of the driven shaft in all of said forward speeds, a device normally locking-out said free wheeling means in all speeds forward and means operable in going into reverse for displacing said device out of lock-out position and which means then operates to again lock-out said free wheeling means.

13. In an automotive transmission, a drive shaft, a driven shaft and gearing operative to provide a plurality of forward speeds and reverse for the driven shaft, free wheeling means associated with the driven shaft and operable to permit an overrunning of the driven shaft in all of said forward speeds, a spring urged device normally locking-out said free wheeling means in all speeds forward, a member operable in shifting into said reverse for displacing said device from said lock-out position and which member again locks out said free wheeling means and means for holding said device out of lock-out position when said member has been moved out of lock-out position.

14. In an automotive transmission, a pair of coacting clutch members, clutch means operable in a relative rotation of said clutch members in one direction for clutching said members together, a shiftable member normally locking said clutch members together independent of said clutch means, a second shiftable member operating in the shifting thereof in one direction to displace said first mentioned member and to again lock said clutch members together, and means operating in the shifting of the second member in the other direction for returning the first mentioned member to said position connecting said clutch members together.

15. In an automotive transmission, a pair of coacting clutch members, clutch means operable in a relative rotation of said clutch members in one direction for clutching said members together, a shiftable member normally locking said clutch members together independent of said clutch means, a second shiftable member operating in the shifting thereof in one direction to displace said first mentioned member and to again lock said clutch members together, means operating in the shifting of the second member in the other direction for returning the first mentioned member to said position connecting said clutch members together and means operable to lock the first mentioned member in that position into which it has been shifted, by said second mentioned member when shifted in said first mentioned direction.

16. In an automotive transmission, a pair of coacting abutting clutch members, means associated therewith to clutch them together in a relative rotation of one member with respect to the other in one direction, a member having a shiftable splined connection on said clutch members and normally locking them together independent of said means associated therewith and a second member also having a shiftable splined connection on said clutch members and movable in one direction to dislodge said first mentioned member and lock said clutch members together independent of said means associated therewith to clutch them together.

17. In an automotive transmission, a shiftable collar for locking two clutch members together, a yoke operatively engaged with said collar for imparting movement thereto, spring means normally acting to move said collar in one direction and means for positively moving the yoke to shift said collar in the other direction against the action of the spring, said means being formed to provide a limited lost motion, whereby said collar may be shifted in said other direction without disturbing said means for positively moving said yoke in the other direction.

18. In an automotive transmission, a shiftable collar for locking two clutch members together, a rock shaft, a yoke mounted on said shaft for a limited movement and engaged with said collar, spring means tending to swing said yoke in one direction and means operatively connected to said rock shaft and operable to swing the yoke in the other direction against the action of said spring means.

19. A transmission embodying therein, an overrunning clutch comprising coacting externally splined clutch members, means associated with said clutch members and operable in a relative rotation therebetween in one direction for automatically clutching them together, internally splined means movable on said clutch members for normally locking-out the action of said means associated with said clutch members and means normally urging said internally splined means to lock-out position on said clutch members.

20. A transmission embodying therein, a driven shaft and a driving member, an overrunning clutch between said shaft and member, a gear shiftable on said clutch to drive the driven shaft in reverse from the driving member and means operative in so shifting said gear to lock-out said overrunning clutch.

21. A transmission embodying therein, a driven shaft and a driving member, an overrunning clutch between said shaft and driving member, and a gear surrounding a part of said clutch and shiftable in one direction thereon to provide forward speed for said driven shaft and shiftable in the other direction thereon to provide reverse for said driven shaft, said gear when shifted in said other direction operating to lock-out said overrunning clutch and when shifted in the first mentioned direction operating to again lock-in said overrunning clutch.

22. A transmission embodying therein an overrunning clutch, a collar for locking out said clutch, a shifter yoke, having a portion operatively engaged with said collar, means providing a pivotal mounting for another portion of said yoke and means arranged adjacent said mounting and operatively engaged with the yoke and operating through the same for normally urging the collar toward lock out position.

23. A transmission embodying therein an overrunning clutch, a collar for locking out said clutch, a shifter yoke, having a portion operatively engaged with said collar, means providing a pivotal mounting for another portion of said yoke, means arranged adjacent said mounting and operatively engaged with the yoke and operating through the same for normally urging the collar toward lock out position and means associated with said mounting for actuating the yoke to move the collar out of lock out position against the action of said urging means.

WILLIAM J. ISHAM.